United States Patent [19]
Helgerson et al.

[11] Patent Number: 5,558,206
[45] Date of Patent: Sep. 24, 1996

[54] CONVEYOR TECHNOLOGY

[75] Inventors: David E. Helgerson, Plymouth; Brian R. Lee, Prior Lake, both of Minn.

[73] Assignee: Quickdraw Design and Drafting, Inc., Burnsville, Minn.

[21] Appl. No.: 312,452

[22] Filed: Sep. 26, 1994

[51] Int. Cl.⁶ ................................................ B65G 13/06
[52] U.S. Cl. ........................................ 198/781.04; 193/37
[58] Field of Search ........................... 198/465.3, 781.02, 198/781.04, 790; 193/37

[56] References Cited

U.S. PATENT DOCUMENTS

| | | |
|---|---|---|
| 3,066,788 | 12/1962 | Christiansen . |
| 3,563,721 | 5/1968 | Ritter . |
| 4,006,815 | 2/1977 | Werntz . |
| 4,143,525 | 3/1979 | Major . |
| 4,331,228 | 5/1982 | Galarowic . |
| 4,479,572 | 10/1984 | Merz . |
| 4,781,283 | 11/1988 | Bentley et al. . |
| 4,815,588 | 3/1989 | Katsuragi et al. . |
| 4,844,231 | 7/1989 | Usui . |
| 4,930,618 | 6/1990 | Roh . |
| 4,993,541 | 2/1991 | Roh . |
| 5,040,669 | 8/1991 | Blocker . |
| 5,161,673 | 11/1992 | Cairns . |
| 5,318,167 | 6/1994 | Bronson et al. . |
| 5,361,884 | 11/1994 | Yonezawa ................................ 193/37 |
| 5,392,899 | 2/1995 | Wakabayashi ........................... 198/790 |

*Primary Examiner*—Joseph E. Valenza
*Attorney, Agent, or Firm*—Robert C. Baker

[57] ABSTRACT

A slip roller conveyor has parallel side walls and a plurality of driven slip roller assemblies mounted therein. Each driven assembly comprises a stub shaft that is threadedly mounted in the side wall and has a wrench-engageable head. A pulley with a sleeve extension is rotatably mounted on the shaft and a slip roller is mounted on the sleeve. The entire driven slip roller assembly is easily removed from its wall mounting by simply engaging the head with a wrench and unscrewing the shaft from its wall mounting. The conveyor drive system includes a positive drive belt having its grooves and teeth intermeshed with mating grooves and teeth on the driven pulleys. A side edge of the belt is guided by the inner surface of the conveyor side wall. A guide strip having an anti-camming surface keeps the drive belt intermeshed with the pulleys along the drive run of the drive belt.

20 Claims, 2 Drawing Sheets

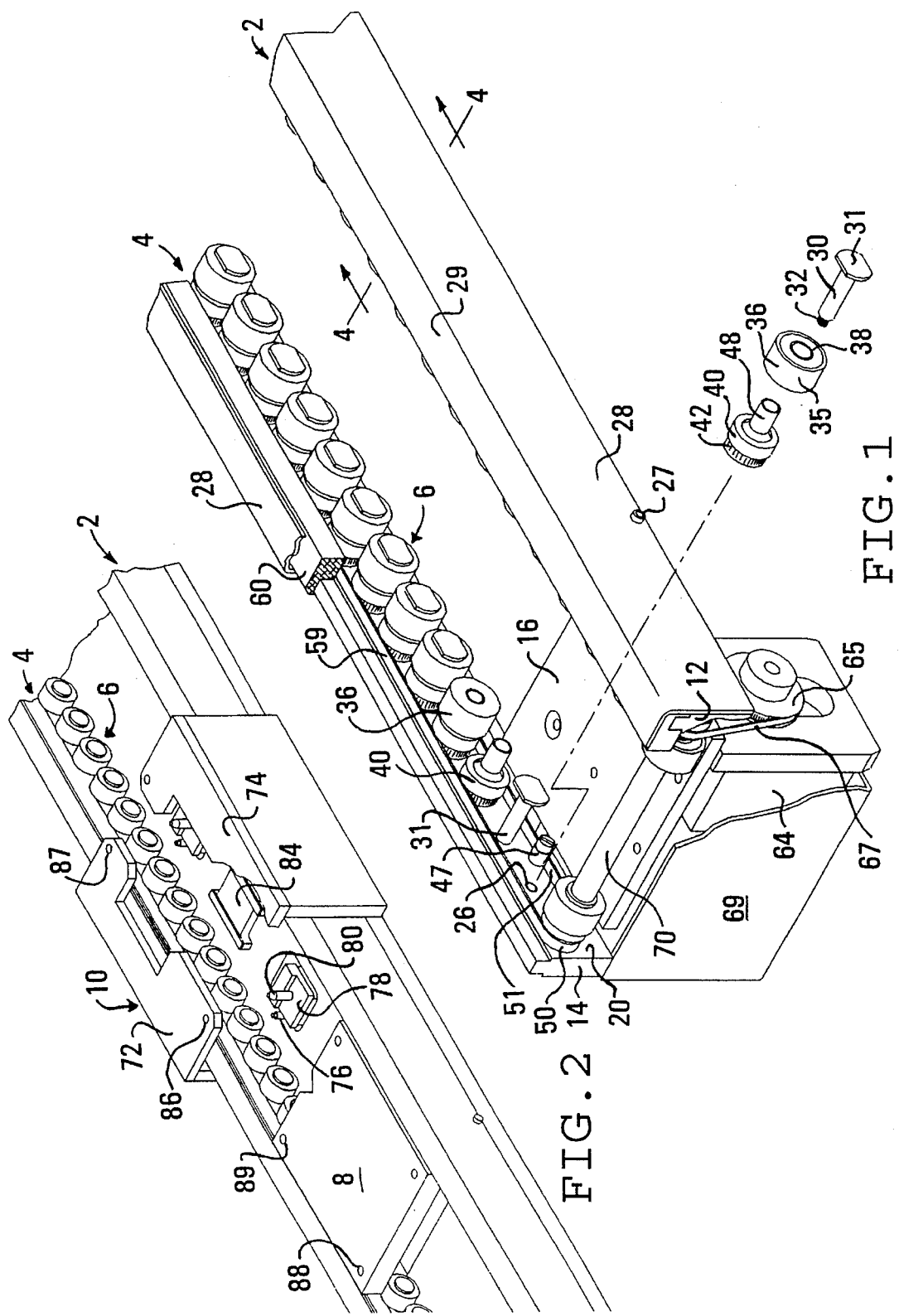

5,558,206

CONVEYOR TECHNOLOGY

BACKGROUND OF THE INVENTION

This invention relates to conveyor technology and more particularly to conveyor systems having an exceedingly compact and practical structure for moving articles along a pathway.

Heretofore known conveyor systems have employed design features of a rather complex nature that make the systems not easy to disassemble when the need arises for repair or replacement of a broken or worn part. The known designs (e.g., such as in Usui U.S. Pat. No. 4,844,231 of Jul. 4, 1989) have relied upon tested and true fastening assembly elements and their relationships and functions, even as the technology has inched forward with better arrangements for rollers, shafts, sleeves, and the like. Simplification of parts relationships and the reduction of parts needed, while imparting multiple functions for the simplified parts, has not been an especially notable trend in the art of conveyor technology.

SUMMARY OF THE INVENTION

This invention provides a new type of conveyor having roller assemblies of a compact structure for moving articles along a pathway having a lengthwise direction. The new conveyor comprises a pair of laterally spaced side walls extending in the lengthwise direction of the conveyor pathway. Each side wall has an inside surface facing the pathway and an outside surface facing away from the pathway. Further, each side wall has a plurality of roller assemblies mounted therein. The roller assemblies are in spaced relationship and at a uniform height along the lengthwise direction of the pathway. The assemblies support the lateral portions of articles moving along the pathway.

Each driven roller assembly comprises a shaft, a driven rotatable pulley, and a roller carried and rotated by the pulley either as a result of being fixed to rotate with the pulley (e.g., integrated as part of the pulley) or as a result of being allowed to slip rotate on the pulley. The preferred arrangement is that of employing a slip roller carried on a sleeve section of the pulley for slip friction rotation therewith, subject however to non-rotation therewith when a force obstructing rotation of the slip roller exceeds the frictional force effecting rotation of the slip roller on the sleeve section of the pulley.

In a preferred embodiment of the invention, the shaft for the driven roller assembly has an abutting shoulder that rests in flush abutting condition against a side wall of the conveyor as the shaft projects perpendicularly from the side wall. The shaft additionally is characterized by having a radially expanded head at its opposite or inwardmost end. Preferably, the radially expanded head has contours or a design permitting it to be engaged by a wrench for turning it. The other end of the shaft is of reduced diameter beyond its shoulder area and is provided with threads for threadedly securing the shaft in a side wall of the conveyor. Such an arrangement permits exceedingly simple replacement of a worn out roller or pulley or shaft. Since both the pulley and the roller are most preferably made of plastic material (i.e., organic plastic material), the new ease for replacement of parts as taught by this invention, with minimal down time, is a highly valued feature. Plastic material used for the pulley and roller (and possibly also for the shaft) reduces conveyor noise but is susceptible to breakage and wear.

Another preferred embodiment of the invention employs pulleys and a positive drive endless belt having transverse teeth and grooves that mesh with axially extending teeth and grooves of the pulleys along a straight drive run (i.e., the belt section extending along a bank of roller pulleys and effecting their rotation). This embodiment additionally includes a guide strip having an anti-camming surface extending in proximate relationship lengthwise over the drive belt backing surface along the length of the drive run so as to serve as an abutment obstructing the drive belt along the drive run from being cammed out of its meshed relationship with the pulleys. The same guide strip may also function as a side guide for articles conveyed down the conveyor pathway. A side wall of the conveyor may serve not only as a mounting base or frame for roller assemblies but also as a guide surface for an edge of the positive drive endless belt. Thus, preferred practice of the invention not only effects consistent rotation of a series or significant length of pulleys along a straight drive run, but also permits simplification for the design and arrangement of parts while achieving the performance of plural functions by a single part or structure.

Still other features and benefits and advantages of the invention will be evident as this description proceeds.

BRIEF DESCRIPTION OF THE DRAWINGS

FIG. 1 is a schematic perspective view of a conveyor of the invention, with parts broken away and with an exploded view of a roller assembly;

FIG. 2 is a schematic perspective fragmentary view of a conveyor of the invention illustrating an article such as a product carrier progressing along the pathway of the conveyor and illustrating a docking station for performing an operation on the conveyed product carrier or article;

DESCRIPTION OF THE PREFERRED EMBODIMENTS

Figure 3:
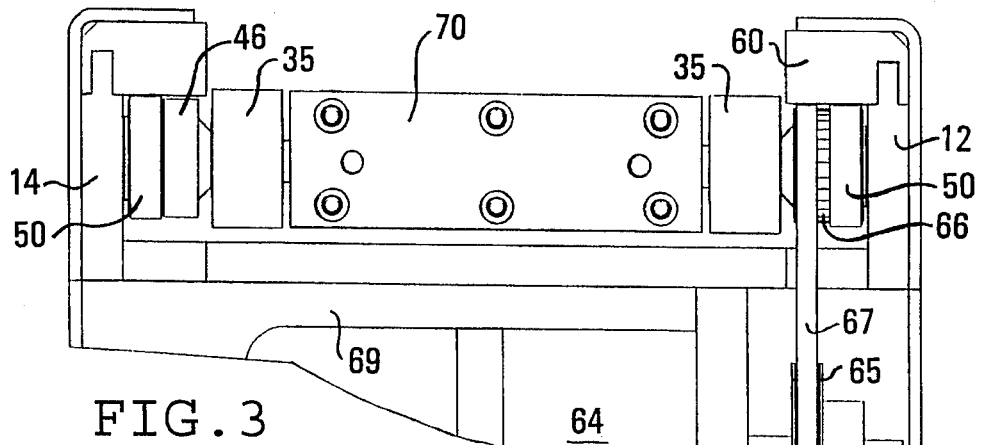
FIG. 3 is a schematic end view of the conveyor of FIG. 1 with parts broken away (and with the connecting shaft 70 enlarged as compared to the showing in FIG. 1)
Figure 4:
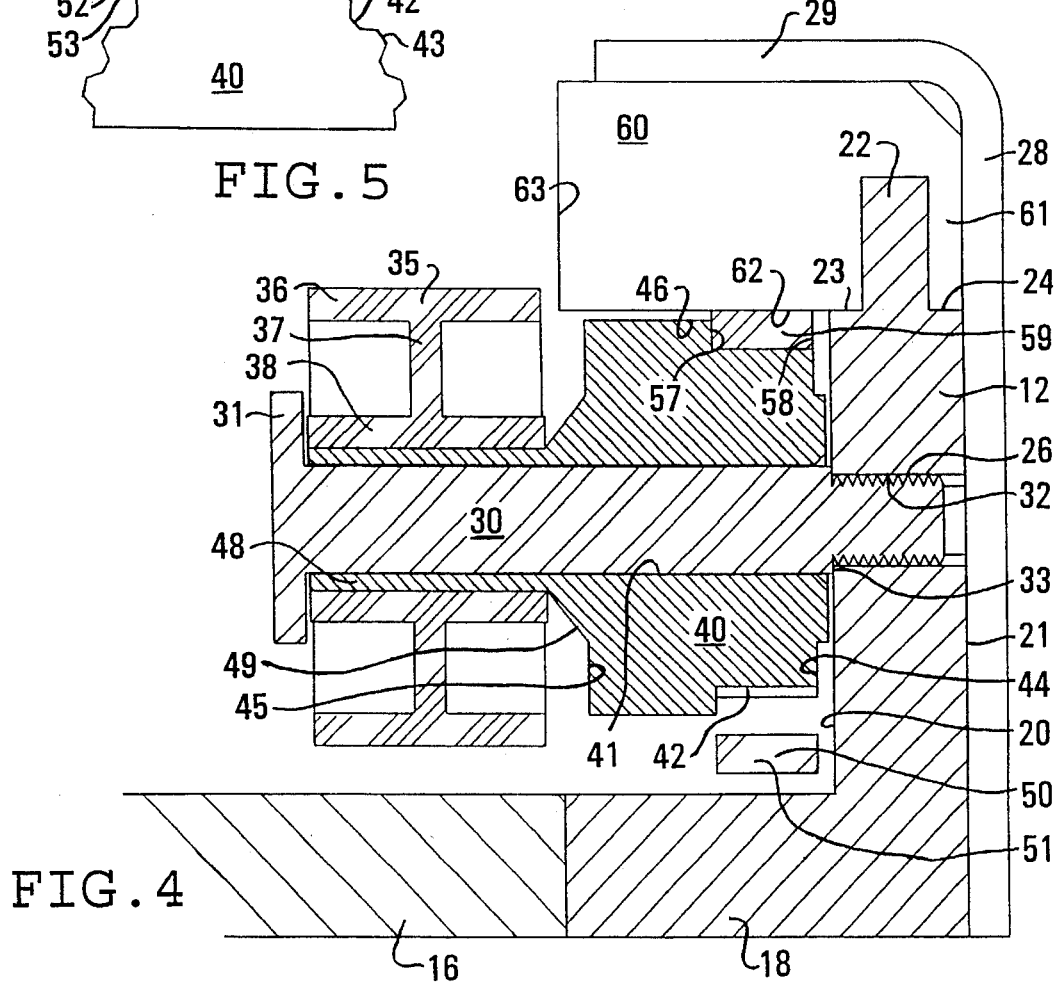
FIG. 4 is a schematic cross-sectional view taken on line 4—4 of FIG. 1 showing a roller assembly of this invention as it is mounted on a side wall of the conveyor.

Referring particularly to FIGS. 1, 2, and 4, the roller conveyor of this invention comprises a left 4 and right 2 bank of roller assemblies 6. The conveyor moves articles or product carriers 8 along its pathway, and the pathway may include one or more docking stations 10 where some sort of operation is performed on the article. The structure of the conveyor includes a pair of laterally spaced side walls 12, 14 extending in the lengthwise direction of the conveyor pathway, and indeed those walls define the maximum width of the conveyor pathway. These side walls are held at a predetermined spacing by one or more transverse spacer plates 16. The structures of each side wall includes a leg or flange base 18 (useful for mounting the side walls on a frame using any suitable fasteners), and the spacer plates 16 may abut and be fastened to the leg 18 by any suitable means. Each side wall 12, 14 has mounted in it a plurality of driven roller assemblies 6 in spaced relationship and at uniform height along the lengthwise direction of the conveyor pathway. These driven roller assemblies 6 are for supporting lateral portions of articles 8 moved along the pathway. Each driven assembly comprises a stub shaft 30, a rotatable driven pulley 40 with a sleeve extension 48, and a roller 35 for supporting articles moved along the pathway of the conveyor. A drive system is provided for effecting rotation of the pulleys and rollers The drive system of preferred character comprises an endless drive belt 50 (see FIGS. 1 and 3). Such a belt is adjacent each side wall 12, 14 of the conveyor.

The features of each side wall and the components mounted thereon are substantially similar (but oppositely oriented), and therefore the following description of details for side wall 12 applies in most essential aspects to side wall 14. The side wall 12 functions as a base wall frame. It has opposite surfaces, including an inside surface 20 facing the pathway and an outside surface 21 facing away from the pathway. It may be provided with a ridge 22 of narrower width along its upper edge so as to form an inner support shoulder 23 and an outer support shoulder 24 along its length. A guide strip 60, discussed hereinafter, is lodged over the ridge 22 (with a lip or hook 61 of the guide strip on the outside of the ridge 22 to assist in holding the guide strip 60 along the top edge of the side wall 12. The guide strip rests or is supported by side shoulders 23, 24. Any suitable fastener may fix the guide strip 60 in such mounted condition. A series of threaded bores or holes or recesses 26 are arranged in a straight line on the side wall in the lengthwise direction of the pathway. The series of threaded bores 26 are aligned at the same vertical height and are preferably arranged so that a fastening hole on one side is laterally aligned (across the pathway) with a hole in the opposite side wall. Side walls of metal such as steel or aluminum are preferred, but walls of plastics such as nylon may be used.

A reinforcing frame cover 28 with leg 29 may be fastened to the side wall by one or more fasteners 27. Such a cover may be employed, if desired, to assist in holding the guide strip 60 in position, and should be employed where the guide strip lacks desired rigidity. Any suitable combination of underlying support frame elements 69 and safety covers 69 may be employed.

The preferred driven roller assemblies are slip roller assemblies, although fixed rollers may be employed in making an entire conveyor and are sometimes suitable at intervals between slip roller assemblies. Fixed rollers lacking the slip property exert an unrelenting drive force on articles supported on them.

Illustratively, a plurality of driven slip roller assemblies 6 (see FIG. 1) are mounted on each side wall in spaced relationship to each other in a straight line in the pathway's lengthwise direction. Such roller assemblies may be spaced at varying distance from each other along a side wall. A very useful spacing for conveyors for the electronics industry has been found to be about one inch (about 2.5 cm) on center. Greater spacing and larger roller assemblies may be employed. The rollers of a side wall are preferably (but not critically) in an opposing relationship to the roller assemblies mounted on the other side wall. Each side wall has a bank of roller assemblies. A bank will usually have at least five roller assemblies 6, and usually will have at least 20 or 30 or more, all driven by a single drive belt extending the entire length of the bank. Between the lateral banks of roller assemblies is a substantially unobstructed space where optional accessories such as, for example, a docking station 10 may be installed.

Referring particularly to FIGS. 1 and 4, each driven roller assembly has a stub shaft 30 supporting it. The stub shaft is of uniquely simplified design. It has a radially expanded head 31 at its innermost end (i.e., its end extending inwardly from the side wall). The other end of the stub shaft is provided, in its most preferred form, with spiral threads 32. This portion with spiral threads is of smaller diameter than the main body or length of the stub shaft. A shoulder 33 is provided at the juncture between the threaded section 32 and the main portion or body of the shaft 30. The radial extent or diameter of the preferred shoulder 33 is the same (i.e., coincides with) the radial extent or diameter of the main body of shaft 30. The mounting bore 26 in the side wall 12 is matingly threaded so that the stub shaft is easily threadedly mounted in the side wall and the head end 32 easily tightened by the use of a wrench to force the shoulder 33 firmly against the inside flat surface 20 of the side wall. This in turn effectively causes the stub shaft to project perpendicularly inward from the inside surface of the side wall. This preferred mounting of the stub shaft in the side wall effectively prevents the stub shaft from rotating, but rotation of it is not important (although a rotatable mounting for a stub shaft in a side wall may be optional). Metal shafts such as those of stainless steel or aluminum are preferred, but plastic shafts such as those of nylon or polyamides may be employed, if desired.

Figure 5:
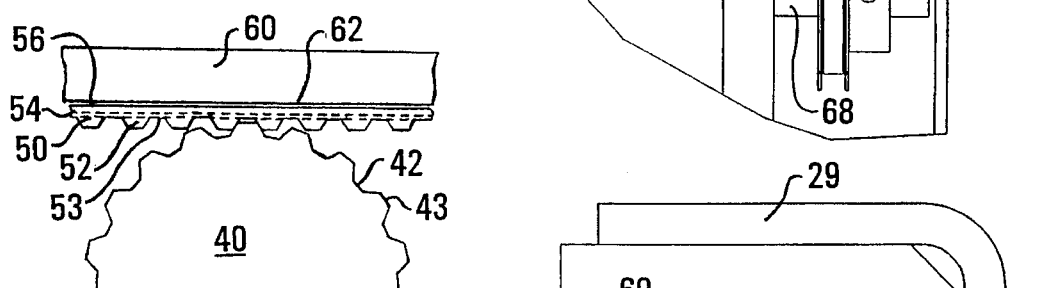
FIG. 5 is a schematic fragmentary view of a preferred drive belt according to this invention and shows its relationship between a pulley and the anti-camming surface of a guide strip along a straight drive run according to the invention.

The preferred pulley 40 for the driven roller assemblies is one characterized as a driven rotatable pulley. This pulley has an outer circumferential periphery equipped with axially extending teeth 43 and grooves 42 (see FIGS. 4 and 5). It has an inner axial bore 41 (i.e., the inner surface of its hub) of a size permitting the pulley to slide axially over the shoulder 33 and main body of the shaft 30. Also, the axial bore 41 of pulley 40 may be and preferably is of slightly greater diameter than the diameter of shoulder 33 and main body of shaft 30. This facilitates a relatively low friction rotation of pulley 40 on shaft 30. This pulley further has a lateral outside face 44 essentially free of any annular ridge or flange at its outer circumferential periphery. Its lateral inside face 45 is indeed equipped with an annular ridge 46 or flange at its outer periphery. The annular ridge 46 has a radius at least as great as the radius of the outer tips of the axially extending teeth 42 of the pulley.

The annular ridge 46 of driven pulleys 40 is shown in FIG. 4 to have a relatively large or long axial dimension, and the reason for this is evident from the showing in FIG. 3. The transfer belt 67 and the inner portion of the driver pulley 66 are spaced from the inner surface 20 of the side wall 12 to an extent about equal to the spacing of the large or long axial dimension of the annular ridge 46 of driven pulleys 40 from the side wall. This arrangement permits location of the drive belt 50 adjacent the inner surface 20 along the entire drive run 45 of drive belt 50. As particularly illustrated in FIGS. 1 and 4, the pulley's lateral outside face 44 (i.e., the face most distant from the center line of the conveyor) is located in an adjacent (i.e., very near) relationship to the inside surface 20 of the side wall of the conveyor.

A further feature of the pulley 40 is that it has a sleeve section 48 extending axially out from the lateral inside face, and this sleeve section has a continuation of the pulley's internal bore and its characteristics as discussed above. The preferred arrangement of the pulley on the stub shaft 30 is such as to allow rotation of the pulley and its sleeve on the stub shaft. A beveled or sloped spacer portion 49 on pulley 40 is located at the juncture between the pulley's inside face 45 and sleeve 48. This beveled portion reinforces the sleeve connection to the pulley and also serves as a spacer to space roller 35 a slight distance from the inside face 45 of the pulley.

To be noted is that there are no special roller bearings or bushings in the compact structure for the roller assembly as the same is formed according to the preferred embodiment of this invention.

The roller of the preferred three-element driven roller assemblies may take various forms. In one form, the roller may essentially be seated on the sleeve 48 of the pulley in a manner fixing the roller so that it rotates with the pulley. In this approach, the driven roller assemblies consist essentially of two parts, namely a shaft and a pulley with roller as an integral part of it.

The preferred slip roller assemblies of the invention carry the roller on the sleeve section 48 of the pulley for slip friction rotation therewith. In this embodiment, the roller 35 has an axial bore somewhat larger in diameter than the circumferential outer peripheral surface of the sleeve section 48 on the pulley, so that contact between the sleeve section 48 and roller 35 is not continuous around the circumference of the sleeve. This contact may be more or less limited to a line area (parallel to the shaft axis) extending along the uppermost portion of the sleeve 48 as it rests on the uppermost portion of shaft 30. The friction between the roller 35 and the sleeve 48 causes the roller to rotate with the sleeve under normal circumstances and thus causes articles resting on the roller to be advanced along the length of the pathway of the conveyor. The tendency of the roller to rotate in slip friction relationship with the sleeve 48 of the pulley tends to increase in proportion to the downward force applied to the roller by the weight of any article carried by it. But the roller may slip on the sleeve, even to the extent that the roller will remain stationary while the sleeve continues to rotate. Thus, the roller may be prevented from rotating with the sleeve by vectors of force applied to the outer annular surface of the roller 35 that are greater in magnitude than the frictional relationship between the sleeve and roller that effects the rotation of the roller with the sleeve 48. It is when the force obstructing rotation exceeds the friction effecting rotation that the roller 35 will slip and not rotate in unison with the sleeve 48.

The design of the most preferred roller is such that it has an outer annular ring 36 and an inner annular hub 38 maintained in a coaxial relationship by radially extending web 37 between the outer 36 and inner 38 annular members. The outer ring 36 forms the annular support surface for articles on the conveyor, and the inner annular hub defines the bore of the roller. The inner hub preferably is slightly greater in axial length than the outer ring, but a vice-versa relationship remains operable so long as clearances for rotation of an axially extended outer annular ring 36 are maintained. Generally the hub 38 axial length should approximate the sleeve 48 axial length.

The drive system (see FIGS. 1 and 3) employs an endless drive belt 50, which is engaged with each of the driven pulleys 40 along the entire drive run 59. Drive run 59 encompasses the series of driven roller assemblies 6 extending over the length of the conveyor (or conveyor section where a composite conveyor is made up of sections). By far the most preferred endless drive belt 50 is one characterized as a positive drive belt. An illustrative positive drive belt is known as a "timing belt." Positive drive belts transfer the driving force of a driver pulley (such as at 66 in FIG. 3) to all driven pulleys 40 without relying solely upon a frictional relationship between the belt and the pulleys. Therefore, a positive drive belt is not as vulnerable to slippage, especially when the positive drive belt is maintained in a proper meshing relationship with the circumference of the pulleys.

An endless loop of positive drive belt generally has a rectangular transverse cross-section with opposite surfaces and opposite side edges. The positive drive surface of the belt most typically faces inward and has axially extending cogs or teeth 52 and grooves 53 between the teeth. The teeth 52 and grooves 53 of the belt are suitably sized to properly mesh with the grooves 42 and teeth 43 of the driven pulleys 40. The teeth 52 and grooves 53 extend axially or laterally from the inside edge 57 of the belt to the outside edge 58; this provides maximum tooth contact with a pulley for the width of the belt employed. Although timing belts are sometimes employed to drive pulleys synchronously (hence the name "timing" belt), complete synchronization with the pulleys is unnecessary for the purpose of this invention. In fact, synchronization of slip rollers would be difficult in view of the slip relationship between the sleeve 48 and the slip rollers 35.

A significant feature of the positive drive belt for the invention is that it is effective to transmit a driving force reliably over surprisingly long drive runs 59, with the driven pulleys 40 and their sleeves 48 rotatably driven at substantially the same speed at all locations along the longitudinal length of the drive run 59, more or less regardless of the length of a the drive run 59 and regardless of the distance between the driver pulley and any driven pulley.

The back surface 56 opposite the drive or toothed surface of the belt is characteristically substantially smooth and continuous, and planar or substantially flat along the belt's drive run. This flat condition for the back surface contributes to its easy and smooth sliding under the anti-camming surface 62 of the guide strip 60 without producing excessive friction.

The positive drive belt is most preferably constructed with cords or filaments 54 (see FIG. 5) that enhance resistance to longitudinal stretch of the belt. The filaments extend perpendicular to the transverse belt teeth 52. They extend along the longitudinal extent or direction of the loop of drive belt and may be arranged substantially contiguous (e.g., side by side) across the width of the belt between the side edges 57, 58. Any suitable non-elastomeric filaments may be employed provided that adhesion exists between them and the flexible (and even elastomeric) body material forming the teeth of the belt. Preferred filaments are comprised of materials of the nylon family and include polyamides and aramides (aromatic polyamides) marketed under the trademark "Kevlar."

The drive train (e.g., the pulleys 40 and belts 50) on a side wall may be driven by any suitable power source. An illustrative power source is an electric motor 64 located below the pathway of the conveyor. Preferably, the longitudinally endmost pulley of the bank of roller assemblies functions as the driver pulley for the belt 50. The main driver pulley (e.g., pulley 66 in FIG. 3) has grooves and teeth of sufficient axial width to accommodate the width of the power transfer belt 67 at a lateral location inward from the drive belt 50 on the main driver pulley 66. A motor pulley 65 is mounted on the shaft 68 of the motor 64, and a transfer belt 67 connects the motor pulley to the driver pulley 66. The driver pulley 66 drives the drive belt 50, which in turn drives or rotates the bank of pulleys 40 extending along the length of the drive run 59.

In the most preferred embodiment, the opposite banks of roller assemblies are driven by the same power source. Illustratively, a connector drive shaft 70 is mounted in any suitable way to unite the driver pulley 66 of one bank with the driver pulley of the other bank. The driver pulley of the other bank is not visible in FIGS. 1 and 3 because it is covered by belt 50. Optionally each bank of roller assemblies may be driven by its own power source.

The driver pulley 66 draws or pulls a drive portion or drive run 59 of the belt toward itself over the uppermost portions of the driven pulleys 40, and the belt returns along a return run 51 (see FIG. 1) to the opposite end of the bank of pulleys 40 along a path below the driven pulleys 40. The drive run 59 is substantially straight in the lengthwise direction and preferably meshes only with the teeth 43 and grooves 42 on the uppermost portions of the driven pulleys 40 (see FIG. 5). The drive run 59 thus remains in a substantially tangential orientation to the circumferential outer periphery of the driven pulleys (except for the endmost pulleys).

The return run 51 of the drive belt need not be meshed or otherwise engaged with the pulleys for effective driving of the pulleys. In fact, the return run is most preferably kept away from engagement with the pulleys so as to avoid any possible problems arising from incorrect meshing of the return run with the lowermost teeth and grooves on the driven pulleys 40. In the most preferred embodiment of the invention, return run guides 47 are provided at suitable intervals along the length of the return run to prevent the belt 50 from coming into contact with the lowermost portions of the driven pulleys 40. The return run guides are mounted on a side wall 12, 14 in positions away from the teeth on the pulleys, but not so far from the pulleys that tension is imposed on the belt along its return run 51. Illustratively, these guides are cylindrical posts that may have rotating sleeve surfaces that tend to lessen friction that might result from the belt coming into contact with the guide post. Thus, the return run may be substantially free of tension during operation of the conveyor.

Importantly, the guide strip 60 has an anti-camming surface 62 on its underside that assures a proper meshed relationship between the belt 50 and the driven pulleys 40 along the drive run 59. The guide strip is preferably constructed from a relatively low-friction organic plastic material of any suitable type. Illustratively, ultra high molecular weight (UHMW) polyethylene may be used. Depending on the plastic selected, the strip may be sufficiently stiff or rigid to maintain itself as a rigid guide. It may, however, be somewhat flexible or lacking in stiffness, in which case the strip may be maintained in its proper orientation with respect to the drive belt and the pulleys over long conveyor pathway lengths by the use of multiple fasteners to fix the longitudinal length of the strip on the side wall or by employing a bracket or holder 29 extending over the length of the strip.

The anti-camming surface 62 extends lengthwise along the length of the drive run 59 and is positioned proximate to the back surface 56 of the drive belt in a closely spaced or even touching relationship along the drive run. When the drive belt 50 is in a proper meshed relationship with the bank of pulleys, the belt is obstructed from "camming out," or being moved out of the meshed relationship with the pulleys by the abutment of the anti-camming surface 62 against the drive belt back surface 56. "Camming out" of the drive belt on a pulley occurs when the belt moves in a radially outward direction from the pulley. Excessive radial movement by the belt may allow the belt teeth to ride up on the pulley teeth and skip or slip over the pulley teeth without imparting rotational motion to the pulley. The proximity of the anti-camming surface 62 to the back surface 56 (see FIG. 5) obstructs or blocks excessive radial movement by the belt away from the pulley and thereby prevents any substantial unmeshing of the belt from the pulley (and any resulting slippage). In the most preferred relationship, the back surface 56 of the belt does not have significant contact with the anti-camming surface 62 when the belt is fully meshed with the pulley.

The anti-camming surface is substantially flat and smooth along its lateral and lengthwise extents and normally performs to give only radial guidance to the belt, with no significant lateral guidance provided to the belt. Lateral guidance at the outside edge of belt 58 is provided by the side wall.

Lateral belt guidance for the inside edge 57 of the belt is provided by the annular ridge 46 of the pulleys, but no such ridge need be present at the circumferential periphery of the outside face of the pulleys. By positioning the pulleys 40 adjacent the side walls 12, 14, the added function of guiding the outside edge 58 of the belt is performed by the side walls. They prevent significant outside axial or lateral movement of the belt with respect to the pulley. This feature eliminates the need for an outside edge flange or ridge on the pulleys 40 and permits the roller assembly to be more axially compact as compared to where pulleys employing a flange at each of their edges are used. Also, the anti-camming surface may perform its function more efficiently under the relationships illustrated.

The guide strip also may provide a lateral guide surface 63 (see FIG. 4) along the length of the conveyor pathway, for guiding articles moving along the pathway with minimal friction.

The substantially open pathway between the opposing banks of slip roller assemblies permits work stations to be simply integrated without requiring specialized or customized changes to the conveyor structures. For example, a product carrier docking station 10 may be "piggybacked" onto a basic conveyor segment without altering the basic functioning or structure of the conveyor. The docking station 10 stops and lifts an individual carrier 8 into an elevated stationary position so that a required task can be performed on an article or product carried on the carrier 8. The docking station 10 is comprised of opposing horizontally cantilevered docking plates 72 and 74 that extend over the opposite side walls of the conveyor toward each other and substantially over the slip roller assemblies. The plates 72, 74 do not meet in the middle but extend far enough so that their innermost reaches will intercept or block the outer lateral portions of a carrier 8 as it is raised up and off the roller assemblies.

A metering stop 78 mounted just upstream of the docking station 10 and between the opposing banks of roller assemblies includes a stop pin 80 mounted on a pneumatic ram (not shown) below the pathway. The ram raises the stop pin 80 into a position where it can arrest or block forward movement of a carrier. The stop pin 80 may be cushioned by a shock absorber to prevent impact with the stop pin from excessively jarring the carrier 8. As the carrier arrives at the raised stop pin 80, a sensor 76 mounted adjacent to the metering stop 78 senses the presence of the carrier. A preferred sensor is constructed with fiber optic materials and has an integral light source and light detector to detect light reflected off the bottom of a carrier passing above the sensor. If the docking station is able to receive the carrier (e.g., no other carrier is at the docking station), the metering stop ram retracts the stop pin 80 to allow the carrier to proceed into the docking station 10. Another sensor and metering stop are mounted just inside the downstream end of the docking station to stop the carrier in the appropriate position in the station for lifting. Situated below the docking plates 72, 74 is an elevating ram 84 that may be raised above the top of the roller assemblies to lift the carrier off the slip rollers and into a docked relationship with the docking plates. The docking plates have locating pins 86, 87 (shown only on the docking plate 72) with conical ends that depend from the bottom of the plates. The pins 86, 87 insert into similarly sized locating holes 88, 89 in the upper surface of the carrier as the carrier is raised. These pins serve to accurately locate and rigidly hold the carrier against lateral movement when it is docked. Operations may be performed upon the product or articles carried on the carrier at this point. When such operations are finished, the elevating ram 84 is lowered and the carrier comes to rest on the slip rollers. The docking station metering stop pin is then lowered and the carrier moves on the slip rollers along the pathway. If a carrier arrives at the docking station while another carrier is docked, the stop pin 80 will hold the carrier outside the docking station until the docked carrier has cleared the station.

Still other features such as elevators and curved conveyors may be combined with the teachings herein without sacrifice of the benefits of this invention. Further, those skilled in the art will readily recognize that this invention may be embodied in still other specific forms than illustrated without departing from the spirit or essential characteristics of it. The illustrated embodiments are therefore to be considered in all respects illustrative and not restrictive, the scope of the invention being indicated by the appended claims rather than the foregoing description, and all variations that come within the meaning and range of equivalency of the claims are therefore intended to be embraced thereby.

That which is claimed is:

1. A roller conveyor of compact structure for moving articles along a pathway having a lengthwise direction, said conveyor comprising:

A) a pair of laterally spaced side walls extending in the lengthwise direction of said conveyor pathway, each said side wall having an inside surface facing said pathway and an outside surface facing away from said pathway, B) each said side wall having mounted therein a plurality of driven roller assemblies in spaced relationship and at uniform height along the lengthwise direction of said pathway, said assemblies being for supporting the lateral portions of articles moved along said pathway, each said driven roller assembly comprising:

i) a stub shaft mounted in the side wall so that said stub shaft is fixed against rotation and projects perpendicularly inward from the inside surface of the side wall, said stub shaft being characterized by having an abutting shoulder which rests in abutting condition against said side wall as said shaft projects perpendicularly from said side wall and by having a radially expanded integral head at its inwardmost end, ii) a driven rotatable pulley having an outer circumferential periphery, an inner axial bore of a size permitting said pulley to slide axially over said shoulder onto said stub shaft from said shoulder end of said stub shaft, a lateral outside face, a lateral inside face, and a sleeve section extending axially out from said lateral inside face, said pulley being mounted on said shaft in a manner that allows rotation of said pulley including its sleeve, said pulley having its lateral outside face adjacent to the inside surface of the side wall and having its sleeve section adjacent to and in a rotatable relationship with respect to the radially expanded integral head of said stub shaft, iii) a roller carried on said sleeve section of said pulley for rotation therewith to move articles resting on said roller down said pathway, iv) said radially expanded integral head of said shaft being sufficiently extensive in the radial direction to retain said roller and said sleeved pulley on said stub shaft and to require mounting of said roller and said sleeved pulley on said stub shaft from said shoulder end of said stub shaft before mounting said stub shaft in said side wall, and C) a drive system including an endless drive belt engaged with said pulleys to effect rotation thereof.

2. The conveyor of claim 1 wherein said mounting of said stub shaft in said side wall comprises a threaded mounting and said radially expanded integral head of said shaft has a shape engageable by a wrench for easy removal and replacement of an entire said driven roller assembly of the conveyor.

3. The conveyor of claim 1 wherein said driven rotatable pulley comprises plastic material.

4. The conveyor of claim 1 wherein said roller carried on said sleeve section is a slip roller mounted for slip friction rotation with respect to said sleeve section and subject to non-rotation therewith when the force obstructing rotation of said slip roller exceeds the friction effecting rotation of said slip roller on said sleeve section.

5. A roller conveyor of compact structure for moving articles along a pathway having a lengthwise direction, said conveyor comprising:

A) a pair of laterally spaced side walls extending in the lengthwise direction of said conveyor pathway, each said side wall having an inside surface facing said pathway and an outside surface facing away from said pathway, B) each said side wall having mounted therein a plurality of driven roller assemblies in spaced relationship and at uniform height along the lengthwise direction of said pathway, said assemblies being for supporting the lateral portions of articles moved along said pathway, each said driven roller assembly comprising:

i) a stub shaft mounted in the side wall to project perpendicularly inward from the inside surface of the side wall, ii) a driven rotatable pulley having axially extending teeth and grooves in its circumferential outer periphery, said pulley having a lateral outside face essentially free of any annular ridge at its outer periphery and a lateral inside face, said pulley having a sleeve section extending axially out from said lateral inside face, said pulley being mounted on said shaft in a manner that allows rotation of said pulley including its sleeve, said pulley having its lateral, outside face adjacent the inside surface of the side wall, iii) a roller carried on said sleeve section of said pulley for rotation therewith to move articles resting on said roller down said pathway, and C) a drive system including an endless positive drive belt having an outside edge and a positive drive surface formed of transverse teeth and grooves which mesh with the axially extending teeth and grooves of said driven rotatable pulleys along a straight drive run, said belt having a backing surface of substantially smooth character such that said backing surface provides a substantially flat plane along tile length of said straight drive run, said drive run of said drive belt being adjacent the inside surface of said conveyor side wall, the outside edge of said drive belt being in adjacent relationship to and guided by the inside surface of said conveyor side wall.

6. The conveyor of claim 5 wherein said mounting of said stub shaft in the side wall comprises a threaded mounting that permits removal of said entire driven roller assembly by simply unthreading said stub shaft from its mounting in said side wall.

7. The conveyor of claim 5 wherein said stub shaft is characterized by having an abutting shoulder that rests against said side wall as said shaft projects perpendicularly from said side wall and by having a radially expanded wrench-engageable integral head at its inwardmost end of a size such as to prevent said roller and also said sleeved pulley from slipping off said inwardmost end, said size of said head being such as to require mounting of said roller and said driven rotatable pulley on said stub shaft from said shoulder end of said stub shaft before mounting said stub shaft in said side wall, and wherein said mounting of said stub shaft in said side wall comprises a threaded mounting.

8. The conveyor of claim 7 wherein said roller carried on said sleeve section is a slip roller mounted for slip friction rotation with respect to said sleeve section and subject to non-rotation therewith when the force obstructing rotation of said slip roller exceeds the friction effecting rotation of said slip roller on said sleeve section, and wherein said sleeve section is oriented adjacent to and in a rotatable relationship with respect to said radially expanded integral head of said stub shaft.

9. The conveyor of claim 5 wherein said guide strip additionally functions as a lateral abutment strip for guiding the external side of articles moved along said pathway.

10. A slip roller conveyor of compact structure for moving articles along a pathway having a lengthwise direction and for supporting the articles without jamming even when their movement may be temporarily arrested, said conveyor comprising:

A) a pair of laterally spaced parallel side walls extending in the lengthwise direction of said conveyor pathway, each said side wall having an inside surface facing said pathway and an outside surface facing away from said pathway, B) each said side wall having mounted therein a plurality of driven slip roller assemblies in spaced relationship and at uniform height along a straight line in the lengthwise direction of said pathway, said assemblies being for supporting the lateral portions of product carriers moved along said pathway, each said driven slip roller assembly comprising:
  i) a non-rotatable stub shaft fixedly mounted in the side wall so that said stub shaft is fixed against rotation and projects perpendicularly inward from the inside surface of the side wall, said stub shaft being characterized by having an abutting shoulder which rests in abutting condition against said side wall as said shaft projects perpendicularly from said side wall and by having a radially expanded integral head at its inwardmost end,
  ii) a driven rotatable pulley having an outer circumferential periphery equipped with axially extending teeth and grooves and having an inner axial bore of a size permitting said pulley to slide axially over said shoulder onto said stub shaft from said shoulder end of said stub shaft, said pulley having a lateral outside face essentially free of any annular ridge at its outer periphery and a lateral inside face equipped with an annular ridge at its outer periphery, said annular ridge having a radius at least as great as the radius of said axially extending teeth, said pulley having a sleeve section extending axially out from said lateral inside face, said pulley being mounted on said stub shaft in a manner that allows rotation of said pulley and its sleeve on said shaft, said pulley having its lateral outside face adjacent the inside surface of the side wall, and having its sleeve section adjacent to and in a rotatable relationship with respect to the radially expanded head of said stub shaft,
  iii) a slip roller carried on said sleeve section of said pulley for slip friction rotation therewith subject to non-rotation therewith when the force obstructing rotation of said slip roller exceeds the friction effecting rotation of said slip roller on said sleeve section, and
  iv) said radially expanded integanl head of said shaft being sufficiently extensive in the radial direction to retain said roller and said sleeved pulley on said stub shaft and to require mounting of said roller and said sleeved pulley on said stub shaft from said shoulder end of said stub shaft before mounting said shaft in said side wall, and C) a drive system including an endless positive drive belt having an inside edge and an outside edge and a positive drive surface therebetween, said positive drive surface being formed of transverse teeth and grooves which mesh with the axially extending teeth and grooves of said driven rotatable pulleys along a straight drive run, said belt having a backing surface of substantially smooth character such that said backing surface provides a substantially flat plane along the length of said straight drive run, said drive run of said drive belt being laterally guided by the inside surface of said conveyor side wall along said outside edge of said belt and by the annular ridges of said pulleys along said inside edge of said belt, and D) a guide strip having an anti-camming surface extending in proximate relationship lengthwise over said drive belt backing surface along the length of said drive run, said anti-camming surface being such that it serves as an abutment obstructing said drive belt along said drive run from being cammed out of its meshed relationship with said pulleys along said drive run.

11. The conveyor of claim 10 additionally including a docking station along its length, said docking station including a means for arresting movement of articles supported on roller assemblies of said conveyor.

12. The conveyor of claim 10 wherein said mounting of said stub shaft in said side wall comprises a threaded mounting and said radially expanded integral head of said shaft has a shape engageable by a wrench for easy removal and replacement of an entire said driven roller assembly of the conveyor.

13. The conveyor of claim 1 wherein each said driven roller assembly in at least a part of said conveyor pathway consists essentially of three parts, namely said stub shaft, said driven rotatable pulley, and said roller.

14. The conveyor of claim 13 wherein said mounting of said stub shaft in said side wall comprises a threaded mounting and said radially expanded integral head of said shaft has a shape engageable by a wrench for easy removal and replacement of an entire said driven roller assembly of the conveyor.

15. The conveyor of claim 1 wherein each said driven roller assembly in at least a part of said conveyor pathway consists essentially of two parts, namely said stub shaft and a structure consisting of said driven rotatable pulley and said roller united integrally together.

16. The conveyor of claim 15 wherein said mounting of said stub shaft in said side wall comprises a threaded mounting and said radially expanded integral head of said shaft has a shape engageable by a wrench for easy removal and replacement of an entire said driven roller assembly of the conveyor.

17. The conveyor of claim 5 additionally comprising a guide strip having an anti-camming surface extending in proximate relationship lengthwise over said drive belt backing surface along the length of said drive run, said anti-camming surface being such that it serves as an abutment obstructing said drive belt along said drive run from being cammed out of its meshed relationship with said pulleys along said drive run.

18. The conveyor of claim 17 wherein said mounting of said stub shaft in the side wall comprises a threaded mounting that permits removal of said entire driven roller assembly by simply unthreading said stub shaft from its mounting in said side wall.

19. The conveyor of claim 17 wherein said stub shaft is characterized by having an abutting shoulder that rests against said side wall as said shaft projects perpendicularly from said side wall and by having a radially expanded wrench-engageable integral head at its inwardmost end of a size such as to prevent said roller and also said sleeved pulley from slipping off said inwardmost end, said size of said head being such as to require mounting of said roller and said driven rotatable pulley on said stub shaft from said shoulder end of said stub shaft before mounting said stub shaft in said side wall, and wherein said mounting of said stub shaft in said side wall comprises a threaded mounting.

20. The conveyor of claim 19 wherein said roller carried on said sleeve section is a slip roller mounted for slip friction rotation with respect to said sleeve section and subject to non-rotation therewith when the force obstructing rotation of said slip roller exceeds the friction effecting rotation of said slip roller on said sleeve section, and wherein said sleeve section is oriented adjacent to and in a rotatable relationship with respect to said radially expanded integral head of said stub shaft.

* * * * *